United States Patent
Gotoh et al.

(10) Patent No.: US 6,760,189 B2
(45) Date of Patent: Jul. 6, 2004

(54) SOFT MAGNETIC FILM HAVING HIGH CORROSION RESISTANCE, MAGNETIC HEAD INCLUDING THE SAME, AND METHOD FOR MAKING THE SOFT MAGNETIC FILM

(75) Inventors: Mitsuhiro Gotoh, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 334 days.

(21) Appl. No.: 10/050,497

(22) Filed: Jan. 16, 2002

(65) Prior Publication Data

US 2002/0131205 A1 Sep. 19, 2002

(30) Foreign Application Priority Data

Jan. 17, 2001 (JP) .......................................... 2001-008680
May 23, 2001 (JP) .......................................... 2001-153359

(51) Int. Cl.[7] .............................................. G11B 5/147
(52) U.S. Cl. ......................... 360/126; 428/692; 428/693
(58) Field of Search ................................. 360/126, 125; 428/692, 693; 148/300

(56) References Cited

U.S. PATENT DOCUMENTS

| 5,590,008 | A | * | 12/1996 | Tanabe et al. ............... 360/126 |
| 5,663,006 | A | * | 9/1997 | Nakamura et al. ...... 428/694 R |
| 6,118,628 | A | | 9/2000 | Sano et al. |
| 6,538,845 | B1 | * | 3/2003 | Watanabe et al. ........... 360/126 |
| 6,632,520 | B1 | * | 10/2003 | Hiramoto et al. ........... 428/336 |

FOREIGN PATENT DOCUMENTS

| JP | 5-255886 | 10/1993 |
| JP | 3102505 | 8/2000 |

* cited by examiner

*Primary Examiner*—Robert S. Tupper
(74) *Attorney, Agent, or Firm*—Brinks Hofer Gilson & Lione

(57) ABSTRACT

A soft magnetic film has a composition represented by the formula $Fe_xCo_y\alpha_z$ wherein $\alpha$ is at least one element selected from the group consisting of Rh, Pd, Pt, Ru, and Ir and $X+Y+Z=100$ mass percent. The ratio $X/Y$ by mass percent of Fe to Co is in the range of 2 to 5, and the $\alpha$ content Z is in the range of 0.5 to 18 mass percent. This alloy exhibits a saturation magnetic flux density of at least 2.0 T and high corrosion resistance.

17 Claims, 7 Drawing Sheets

SOFT MAGNETIC FILM HAVING HIGH CORROSION RESISTANCE, MAGNETIC HEAD INCLUDING THE SAME, AND METHOD FOR MAKING THE SOFT MAGNETIC FILM

BACKGROUND OF THE INVENTION

1. Field of the Invention

The present invention relates to soft magnetic films used as core materials of thin-film magnetic heads. In particular, the present invention relates to a soft magnetic film which is composed of an FeCoα alloy wherein α represents a noble metal, which has a saturation magnetic flux density Bs of at least 2.0 T, and which exhibits high corrosion resistance. Also, the present invention relates to a thin-film magnetic head including the soft magnetic film, a method for making the soft magnetic film, and a method for making the thin-film magnetic head.

2. Description of the Related Art

For future higher-density recording, for example, a magnetic material having a high saturation magnetic flux density Bs must be used as a core layer of a thin-film magnetic head to increase the recording density by concentrating the magnetic flux to the vicinity of the gap of the core layer.

A traditionally used magnetic material is a NiFe alloy. The NiFe alloy film is formed by electroplating using a continuous DC and exhibits a saturation magnetic flux density Bs of about 1.8 T.

Although future higher-density recording requires a soft magnetic film having a higher saturation magnetic flux density Bs, the NiFe alloy does not sufficiently meet such a requirement.

Another soft magnetic material often used, other than the NiFe alloy, is an FeCo alloy. The FeCo alloy film having an optimized composition has a higher saturation magnetic flux density Bs than that of the NiFe alloy film, and also has the following problem.

In some configurations of thin-film magnetic heads and other magnetic elements, a NiFe alloy film is disposed on the FeCo alloy film by electroplating. Unfortunately, the FeCo alloy film is dissolved and corroded by ionization during the electroplating.

It is likely that a large potential difference (standard electrode potential difference) is generated between the FeCo alloy film and the NiFe alloy film and causes dissolution of the FeCo alloy film by the galvanic effect.

In a single FeCo alloy film configuration, this film must have high corrosion resistance during the manufacturing processes of thin-film magnetic heads and other magnetic elements. For example, the film must have high corrosion resistance during milling steps of sliders and cleaning steps of the elements. Also, the film must have high corrosion resistance in actual operating environments of thin-film magnetic heads.

Accordingly, in the plating of the NiFe alloy on the soft magnetic film, the soft magnetic film must have a high saturation magnetic flux density Bs and high corrosion resistance.

SUMMARY OF THE INVENTION

An object of the present invention is to provide a soft magnetic film comprising an FeCo alloy which contains a noble metal α such as Pd and which has a saturation magnetic flux density Bs of at least 2.0 T and high corrosion resistance.

Another object of the present invention is to provide a thin-film magnetic head including the soft magnetic film, a method for making the soft magnetic film, and a method for making the thin-film magnetic head.

A soft magnetic film according to the present invention has a composition represented by the formula $Fe_XCo_Y\alpha_Z$ wherein α is at least one element selected from the group consisting of Rh, Pd, Pt, Ru, and Ir, wherein the ratio X/Y by mass percent of Fe to Co is in the range of 2 to 5, the α content Z is in the range of 0.5 to 18 mass percent, and X+Y+Z=100 mass percent.

The element α is added to enhance corrosion resistance. At an α content of less than 0.5 mass percent, the corrosion resistance is not enhanced. At an α content exceeding 18 mass percent, the saturation magnetic flux density Bs does not reach 2.0 T due to a decreased Fe content in the composition.

When the ratio X/Y by mass percent of Fe to Co is in the range of 2 to 5, a saturation magnetic flux density Bs of at least 2.0 T is achieved, as described in experimental results below.

The above soft magnetic film has a saturation magnetic flux density Bs of at least 2.0 T and exhibits higher corrosion resistance than that of an FeCo alloy not containing the element α.

Preferably, the ratio X/Y by mass percent of Fe to Co is in the range of 2.6 to 4.3 and the α content Z is in the range of 3 to 9 mass percent.

A soft magnetic film having such a preferable composition has a saturation magnetic flux density Bs of at least 2.2 T and exhibit higher corrosion resistance than that of an FeCo alloy not containing the element α.

Preferably, the soft magnetic film has a composition represented by the formula $Fe_XCo_Y\alpha_Z\beta_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

A soft magnetic film having such a composition has a saturation magnetic flux density Bs of at least 2.0 T or at least 2.2 T under optimized conditions and exhibits higher corrosion resistance. The element β contributes to higher corrosion resistance due to the formation of a passivation film. When the element β is Ni, the film stress is decreased.

In the present invention, the soft magnetic film may be overlaid with a NiFe alloy film which is formed by plating. Thus, the resulting soft magnetic film is referred to as a composite soft magnetic film.

The noble metal element α is barely ionized alone. In the plating process of a NiFe alloy film on a soft magnetic film containing the element α, the FeCoα alloy is prevented from dissolution by ionization. In an FeCoαβ alloy, a passivation film formed on the surface more effectively prevents the dissolution of the alloy by ionization.

In conclusion, the FeCoα alloy film and the composite soft magnetic film of the FeCoαβ film and the NiFe alloy film have a high saturation magnetic flux density Bs and high corrosion resistance.

The soft magnetic film according to the present invention is preferably formed by plating. A soft magnetic film having a desired thickness or a higher thickness than that by sputtering is thereby formed.

The present invention also relates to a thin-film magnetic head comprising a magnetic lower core layer, an upper core layer formed on the magnetic lower core layer with a magnetic gap provided therebetween, a coil layer for applying a recording magnetic field to the lower core layer and the upper core layer, wherein at least one of the lower core layer and the upper core layer comprises the above-described soft magnetic film.

Preferably, the thin-film magnetic head further comprises a lower magnetic pole layer on the lower core layer and at a face opposing a recording medium, wherein the lower magnetic pole layer comprises the soft magnetic film.

The present invention also relates to a thin-film magnetic head comprising a lower core layer; an upper core layer; and a magnetic pole unit provided between the lower core layer and the upper core layer, the length of the magnetic pole unit being shorter than that of the lower core layer and the upper core layer in the track width direction. The magnetic pole unit comprises a lower magnetic pole layer in contact with the lower core layer; an upper magnetic pole layer in contact with the upper core layer; and a gap layer lying between the lower magnetic pole layer and the upper magnetic pole layer, or comprising an upper magnetic pole layer in contact with the upper core layer and a gap layer lying between the upper magnetic pole layer and the lower core layer, wherein at least one of the upper magnetic pole layer and the lower magnetic pole layer comprises the above-described soft magnetic film.

Preferably, the upper magnetic pole layer comprises the above-described soft magnetic film, the upper core layer on the upper magnetic pole layer comprises a NiFe alloy and is formed by plating.

Preferably, at least one of the upper core layer and the lower core layer includes at least two magnetic sublayers at a portion adjacent to the magnetic gap or at least one of the upper magnetic pole layer and the lower magnetic pole layer includes at least two magnetic sublayers, the magnetic sublayer in contact with the magnetic gap comprising the soft magnetic film.

Preferably, the magnetic sublayer which is not in contact with the magnetic gap is formed by plating a NiFe alloy.

As described above, the FeCoα alloy and the FeCoαβ alloy as soft magnetic films according to the present invention has a high saturation magnetic flux density Bs of at least 2.0 T and high corrosion resistance. Thus, a thin-film magnetic head including a core layer composed of such a soft magnetic film concentrates the magnetic flux to the vicinity of the gap and is suitable for higher-density recording. The thin-film magnetic head also has higher corrosion resistance.

A method for making a soft magnetic film according to the present invention comprises electroplating an $Fe_XCo_Y\alpha_Z$ alloy film wherein α is at least one element selected from the group consisting of Rh, Pd, Pt, Ru, and Ir, the ratio X/Y by mass percent of Fe to Co is in the range of 2 to 5, and the α content Z is in the range of 0.5 to 18 mass percent, and X+Y+Z=100 mass percent.

In the present invention, the electroplating may be performed using a continuous DC current or a pulsed current. A pulsed current is preferable in the present invention.

That is, the FeCoα alloy layer is preferably formed by electroplating using a pulsed current in the present invention. In electroplating using a pulsed current, an operation time for energizing the system and a dead time for suspending the energizing are repeated during the plating process, for example, by ON/OFF switching using a current control element. By introducing the dead time, the $Fe_XCo_Y\alpha_Z$ alloy film is gradually deposited during the plating process, and the current density in the system becomes more uniform compared with plating by a continuous DC.

According to the method of the present invention, The $Fe_XCo_Y\alpha_Z$ alloy film prepared by the electroplating has the following composition: the ratio X/Y by mass percent of Fe to Co is in the range of 2 to 5, and the α content Z is in the range of 0.5 to 18 mass percent, and X+Y+Z=100 mass percent. This soft magnetic film exhibits a saturation magnetic flux density Bs of at least 2.0 T and higher corrosion resistance compared with an FeCo alloy not containing the element α.

Preferably, the ratio X/Y by mass percent of Fe to Co is in the range of 2.6 to 4.3 and the α content Z is in the range of 3 to 9 mass percent. The soft magnetic film having such a composition exhibits a saturation magnetic flux density Bs of at least 2.2 T and higher corrosion resistance compared with a FeCo alloy not containing the element α.

The $Fe_XCo_Y\alpha_Z$ alloy film is electroplated in a plating bath in which the Fe ion concentration is in the range of 1.2 to 3.2 g/liter, the Co ion concentration is in the range of 0.86 to 1.6 g/liter, and the α ion concentration is in the range of 0.2 to 6 mg/liter.

By controlling these ion concentrations, the ratio X/Y of Fe to Co can be set within the range of 2 to 5 and preferably 2.6 to 4.3, and the α content Z can be set within the range of 0.5 to 18 mass percent and preferably 3 to 9 mass percent in the plated $Fe_XCo_Y\alpha_Z$ alloy.

Preferably, the soft magnetic film further comprises an element β wherein β is at least one of Ni and Cr, the composition thereby being represented by the formula $Fe_XCo_Y\alpha_Z\beta_V$, wherein the β content V is in the range of 0.5 to 5 mass percent and X+Y+Z+V=100 mass percent.

Preferably, the plating bath further contains sodium saccharine. Sodium saccharine functions as a stress relaxant to decrease the film stress of the plated FeCoα or FeCoαβ alloy.

Alternatively, the plating bath composition for forming the FeCoα or FeCoαβ alloy may contain 2-butyne-1,4-diol. This compound suppresses coarsening of the crystal grains in the plated alloy. As a result, voids between crystal grains decrease and thus the film has a smooth surface, resulting in a decreased coercive force Hc of the alloy.

Alternatively, the plating bath composition for forming the FeCoα or FeCoαβ alloy may contain sodium 2-ethylhexyl sulfate. Sodium 2-ethylhexyl sulfate being a surfactant removes hydrogen, which is generated during the plating process for forming the FeCoα or FeCoαβ alloy. Thus, this compound prevents the formation of a rough surface, which is caused by hydrogen trapped on the plated film.

Sodium 2-ethylhexyl sulfate may be replaced with sodium laurylsulfate; however, bubbling readily occurs in the plating bath containing sodium laurylsulfate compared with the plating bath containing sodium 2-ethylhexyl sulfate. Thus, it is difficult to determine the content of sodium laurylsulfate not causing bubbling. Accordingly, sodium 2-ethylhexyl sulfate, which barely causes bubbling, is preferably added in an amount which can effectively remove hydrogen.

In a method according to the present invention for making a thin-film magnetic head comprising a magnetic lower core layer, an upper core layer formed on the magnetic lower core layer with a magnetic gap provided therebetween, a coil layer for applying a recording magnetic field to the lower core layer and the upper core layer, at least one of the lower core layer and the upper core layer comprising a soft magnetic film, the method is characterized in that the soft magnetic film is formed by the above-described method.

Preferably, a lower magnetic pole layer is formed on the lower core layer at a face opposing a recording medium by plating so as to protrude on the lower core layer, and the lower magnetic pole layer comprises the soft magnetic film.

In a method according to the present invention for making a thin-film magnetic head having a lower core layer, an upper core layer, and a magnetic pole unit provided between the lower core layer and the upper core layer, the length of the magnetic pole unit being shorter than that of the lower core layer and the upper core layer in the track width direction, the magnetic pole unit including a lower magnetic pole layer in contact with the lower core layer, an upper magnetic pole layer in contact with the upper core layer, and a gap layer lying between the lower magnetic pole layer and the upper magnetic pole layer, or including an upper magnetic pole layer in contact with the upper core layer and a gap layer lying between the upper magnetic pole layer and the lower core layer, the method comprises forming at least one of the upper magnetic pole layer and the lower magnetic pole layer by the above-described method, at least one of the upper magnetic pole layer and the lower magnetic pole layer thereby comprising the soft magnetic film.

Preferably, the upper magnetic pole layer comprises the soft magnetic film, and the upper core layer is formed on the upper magnetic pole layer by electroplating a NiFe alloy.

Preferably, at least one of the upper core layer and the lower core layer includes at least two sublayers at least at a portion adjacent to the magnetic gap or at least one of the upper magnetic pole layer and the lower magnetic pole layer includes at least two magnetic sublayers, the magnetic sublayer in contact with the magnetic gap comprising the soft magnetic film.

Preferably, the magnetic sublayer which is not in contact with the magnetic gap is formed by plating a NiFe alloy.

The soft magnetic film which is formed by electroplating an FeCoα alloy or an FeCoαβ alloy have a composition $Fe_XCo_Y\alpha_Z$ wherein α is at least one element selected from the group consisting of Rh, Pd, Pt, Ru, and Ir, the ratio X/Y by mass percent of Fe to Co is in the range of 2 to 5 and preferably 2.6 to 4.3, the α content Z is in the range of 0.5 to 18 mass percent and preferably 3 to 9 mass percent, and X+Y+Z=100 mass percent, or a composition $Fe_XCo_Y\alpha_Z\beta_V$ wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

A thin-film magnetic head including a core layer composed of such a soft magnetic film can be readily produced with high yield. The resulting thin-film magnetic head has a saturation magnetic flux density BS which is suitable for high-recording density and has higher corrosion resistance compared with an FeCo alloy not containing the element α.

DESCRIPTION OF THE PREFERRED EMBODIMENTS

Figure 1:
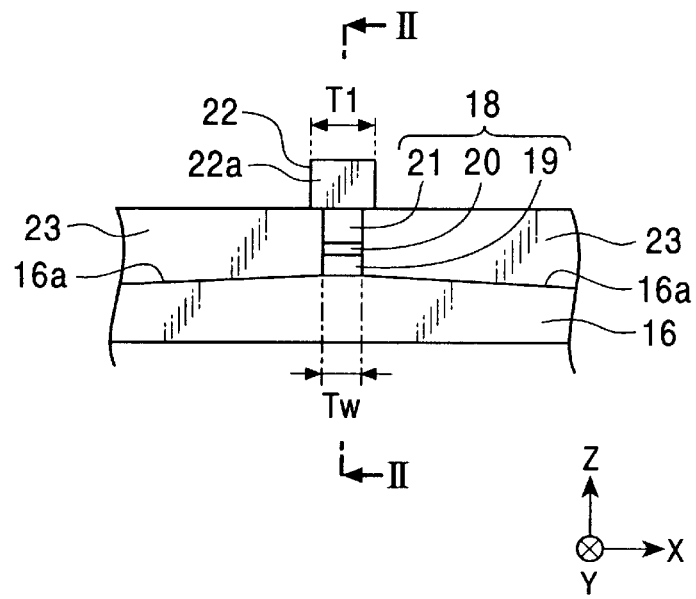
FIG. 1 is a partial front view of a thin-film magnetic head according to a first embodiment of the present invention.
Figure 2:
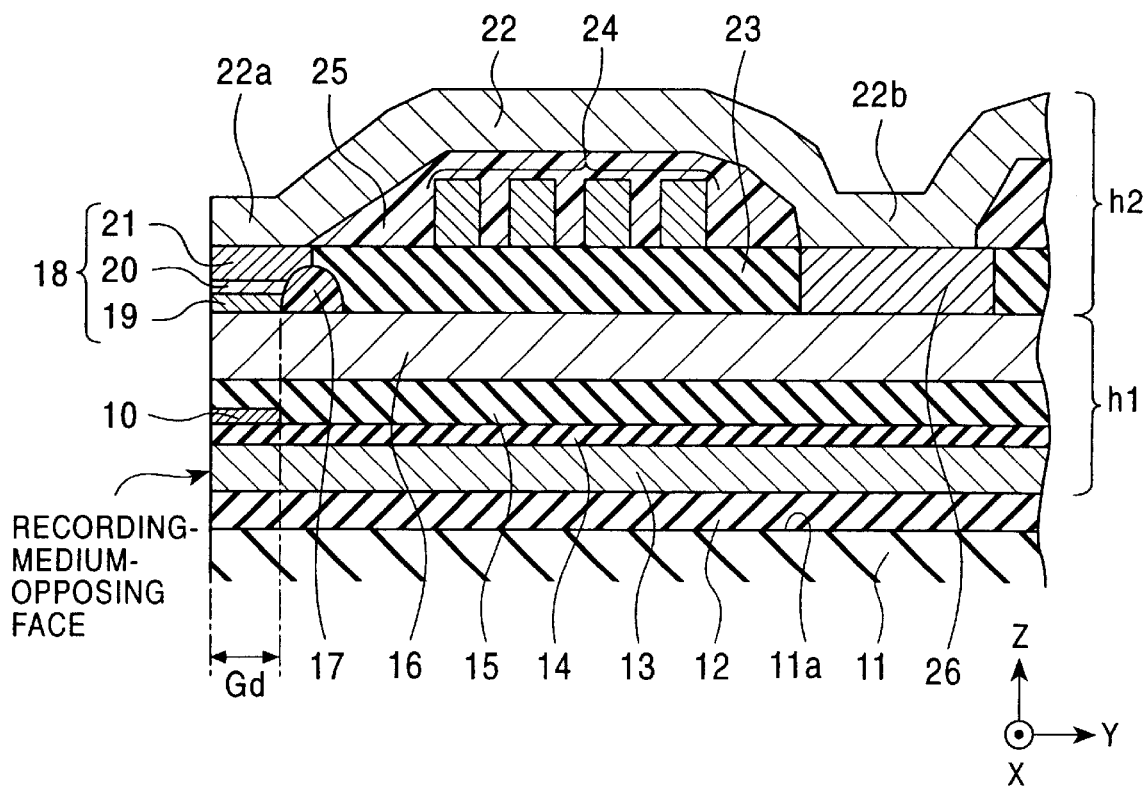
FIG. 2 is a longitudinal cross-sectional view of the thin-film magnetic head shown in FIG. 1.

FIG. 1 is a partial front view of a thin-film magnetic head according to a first embodiment of the present invention and FIG. 2 is a longitudinal cross-sectional view taken from line II—II and viewed from the direction of arrows in FIG. 1.

The thin-film magnetic head according to the present invention is formed on a side face 11a of a ceramic slider 11 of a floating head. The thin-film magnetic head is a MR/inductive composite thin-film magnetic head including a MR head h1 and an inductive write head h2.

The MR head h1 detects a leakage magnetic field as a recording signal from a recording medium such as a hard disk by a magnetoresistive effect.

Referring now to FIG. 2, an $Al_2O_3$ film 12 is formed on the side face 11a of the slider 11, and a lower shield layer 13 composed of a magnetic material such as NiFe is formed on the $Al_2O_3$ film 12. Furthermore, a lower gap layer 14 of an insulating material is formed on the lower shield layer 13.

A magnetoresistive element 10, such as anisotropic magnetoresistive (AMR) element, a giant magnetoresistive (GMR) element, or a tunneling magnetoresistive (TMR) element, extends from a face opposing the recording medium (hereinafter referred to as "recording-medium-opposing face") in the height direction (Y direction in the drawing) on the lower gap layer 14. An upper gap layer 15 of an insulating material is formed over the magnetoresistive element 10 and the lower gap layer 14. An upper shield layer 16 of a magnetic material such as NiFe is formed on the upper gap layer 15. Thus, the MR head h1 is a composite film including from the lower shield layer 13 to the upper shield layer 16.

In the first embodiment shown in FIGS. 1 and 2, the upper shield layer 16 also functions as a lower core layer of the inductive write head h2. A gap-defining layer 17 is formed on the upper shield or lower core layer 16 to define the gap depth (Gd) from the recording-medium-opposing face to the front end of the gap-defining layer 17. The gap-defining layer 17 may be composed of, for example, an organic insulating material.

Referring to FIG. 1, the upper faces 16a of the lower core layer 16 descend as one moves away from the base of a magnetic pole unit 18 in the track width direction (the positive and negative X directions in the drawing) to suppress side fringing.

Referring to FIG. 2, the magnetic pole unit 18 extends from the recording-medium-opposing face and partially covers the gap-defining layer 17.

The magnetic pole unit 18 is a laminate of a lower magnetic pole layer 19, a nonmagnetic gap layer 20, and an upper magnetic pole layer 21 from the bottom.

The lower magnetic pole layer 19 is formed on the lower core layer 16 directly by plating. The gap layer 20 on the lower magnetic pole layer 19 is preferably composed of a nonmagnetic metal capable of plating. Preferably, the gap layer 20 is composed of at least one material selected from the group consisting of NiP, NiPd, NiW, NiMo, Au, Pt, Rh, Pd, Ru, and Cr.

In a preferred embodiment of the present invention, the gap layer 20 is composed of NiP, which can maintain an adequate nonmagnetic state of the gap layer 20.

The upper magnetic pole layer 21 is magnetically coupled with an upper core layer 22 formed thereon.

Thus, the lower magnetic pole layer 19, the gap layer 20 of a nonmagnetic metal capable of plating, and the upper magnetic pole layer 21 can be continuously formed.

The magnetic pole unit 18 may be composed of two layers of the gap layer 20 and the upper magnetic pole layer 21.

As shown in FIG. 1, the magnetic pole unit 18 defines the track width Tw in the track width direction (X direction in the drawing).

Referring to FIGS. 1 and 2, an insulating layer 23 of, for example, an inorganic material extends on both sides in the track width direction (X direction in the drawing) and behind in the height direction (Y direction in the drawing) of the magnetic pole unit 18. The upper face of the insulating layer 23 is flush with the upper face of the magnetic pole unit 18.

Referring to FIG. 2, a spiral coil layer 24 is formed on the insulating layer 23 by patterning. The coil layer 24 is covered with an organic insulating layer 25. The coil layer 24 may have a multilayer configuration, each sublayer being separated by an insulating sublayer.

The upper core layer 22 may be formed over the magnetic pole unit 18 and the insulating layer 25 by patterning by frame plating. As shown in FIG. 1, the leading end 22a, at the recording-medium-opposing face, of the upper core layer 22 has a width T1 in the track width direction. The width T1 is larger than the track width Tw.

The base 22b of the upper core layer 22 is formed directly on a magnetic connecting layer (back gap layer) 26 provided on the lower core layer 16.

In the present invention, the upper magnetic pole layer 21 and/or the lower magnetic pole layer 19 is composed of a soft magnetic film having the following composition.

The composition is represented by the formula $Fe_XCo_Y\alpha_Z$ wherein $\alpha$ is at least one element selected from the group consisting of Rh, Pd, Pt, Ru, and Ir. The ratio X/Y by mass percent of Fe to Co is in the range of 2 to 5, the $\alpha$ content Z is in the range of 0.5 to 18 mass percent, and X+Y+Z=100 mass percent.

An FeCo$\alpha$ alloy having the above composition has a saturation magnetic flux density Bs of at least 2.0 T according to experimental results described below. Thus, the soft magnetic film according to the present invention has a higher saturation magnetic flux density Bs than that of a NiFe alloy.

Fe and Co have magnetism. An optimized ratio X/Y by mass percent of Fe to Co achieves a high saturation magnetic flux density. According to the experimental results, an saturation magnetic flux density Bs of at least 2.0 T is achieved at an X/Y ratio in the range of 2 to 5.

The element $\alpha$ is added to enhance corrosion resistance. If the $\alpha$ content is small, the corrosion resistance is not achieved. If the $\alpha$ content is excessively large, the saturation magnetic flux density Bs decreases due to decreased contents of magnetic Fe and Co. In the present invention, the $\alpha$ content Z is in the range of 0.5 to 18 mass percent so that the saturation magnetic flux density Bs is at least 2.0 T and the corrosion resistance is higher than that of a soft magnetic film composed of only Co and Fe. Preferably, the element $\alpha$ is at least one of Rh, Pd, and Pt to further enhance corrosion resistance.

Since an FeCo$\alpha$ alloy having the above composition forms a dense crystal phase, the film surface is smooth, enhancing corrosion resistance and decreasing the coercive force Hc to 2,000 A/m or less.

Furthermore, an FeCo$\alpha$ alloy having the above composition exhibits a specific resistance of 15 $\mu\Omega\cdot$cm or more and a film stress of 400 MPa or less. In addition, this alloy has an anisotropic magnetic field Hk comparable with that of a NiFe-based alloy, which is conventionally used as a soft magnetic material.

In the present invention, preferably, the ratio X/Y by mass percent of Fe to Co is in the range of 2.6 to 4.3 and the $\alpha$ content Z is in the range of 3 to 9 mass percent to achieve a saturation magnetic flux density Bs of at least 2.2 T and higher corrosion resistance than that of an FeCo alloy not containing $\alpha$.

In the present invention, preferably, the soft magnetic film has a composition represented by the formula $Fe_XCo_Y\alpha_Z\beta_V$, wherein $\beta$ is at least one of Ni and Cr, the ratio X/Y by mass percent of Fe to Co is in the range of 2 to 5 and more preferably in the range of 2.6 to 4.3, the $\alpha$ content Z is in the range of 0.5 to 18 mass percent and more preferably in the range of 3 to 9 mass percent, the $\beta$ content V is in the range of 0.5 to 5 mass percent, and X+Y+Z+V=100 mass percent.

The upper magnetic pole layer 21 and/or the lower magnetic pole layer 19 comprising a soft magnetic film having such a composition exhibit a saturation magnetic flux density Bs of at least 2.0 T or at least 2.2 T under optimized conditions. Further more, the element $\beta$ contributes to higher corrosion resistance due to the formation of a passivation film. Since Ni contributes to decreased film stress, the element $\beta$ is preferably Ni.

Since the FeCo$\alpha$ or FeCo$\alpha\beta$ alloy according to the present invention has a saturation magnetic flux density Bs of at least 2.0 T or 2.2 T under optimized conditions, the upper magnetic pole layer 21 and/or the lower magnetic pole layer 19 composed of the FeCo$\alpha$ or FeCo$\alpha\beta$ alloy concentrates the magnetic flux to the vicinity of the gap of the magnetic pole layer, increasing the recording density. Furthermore, the thin-film magnetic head has higher corrosion resistance than that using an FeCo alloy not containing the noble metal $\alpha$.

Figure 3:
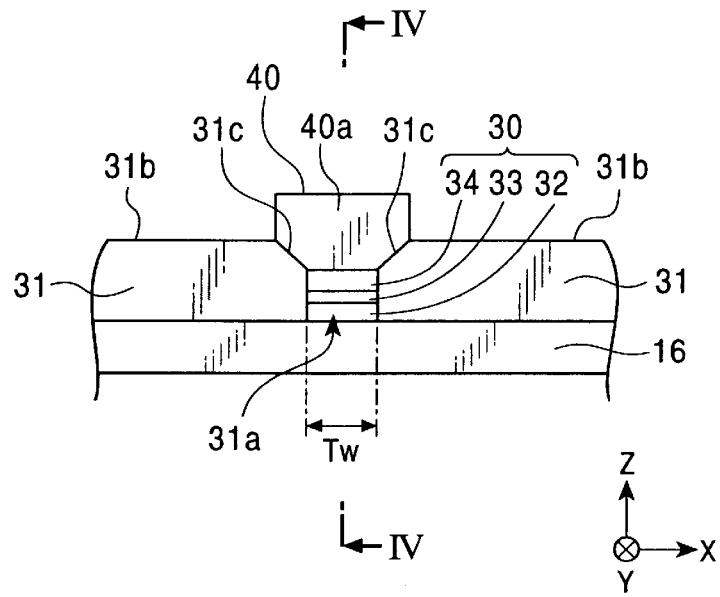
FIG. 3 is a partial front view of a thin-film magnetic head according to a second embodiment of the present invention.
Figure 4:
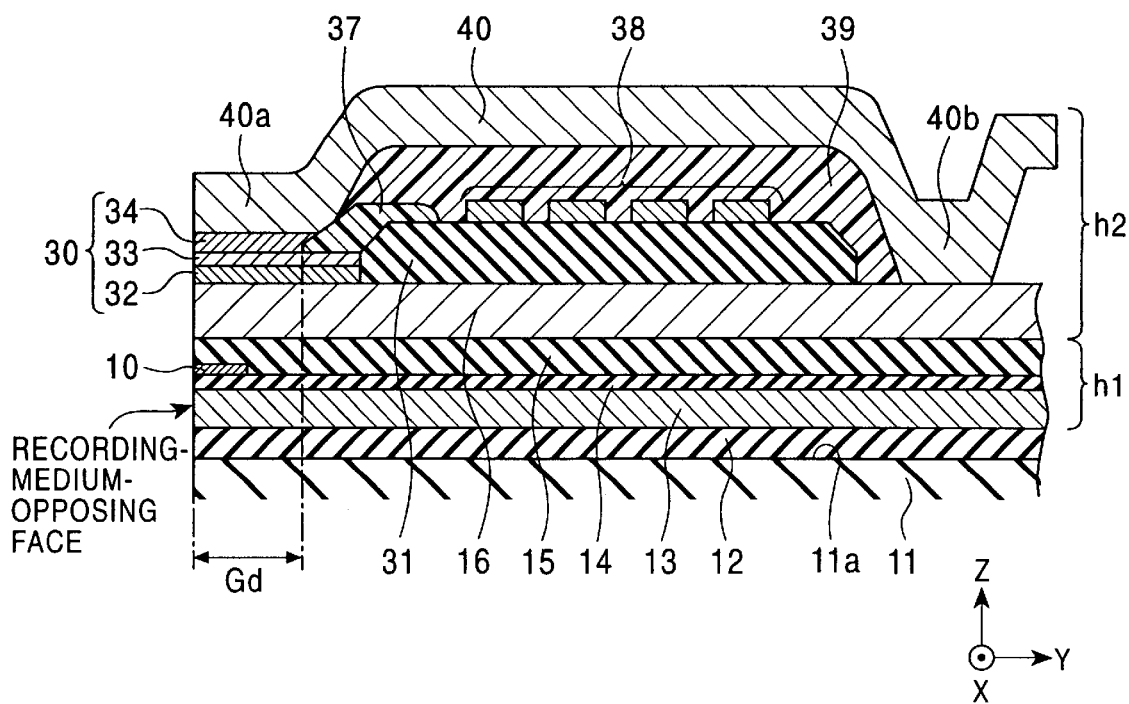
FIG. 4 is a longitudinal cross-sectional view of the thin-film magnetic head shown in FIG. 2.

FIG. 3 is a partial front view of a thin-film magnetic head according to a second embodiment of the present invention, and FIG. 4 is a longitudinal cross-sectional view taken from line IV—IV and viewed from the direction of arrows in FIG. 3.

The MR head h1 in the second embodiment has the same structure as that shown in FIGS. 1 and 2.

An insulating layer 31 of, for example, an inorganic material is formed on the lower core layer 16. A groove 31a for defining the track width Tw is formed in the insulating layer 31 behind the recording-medium-opposing face in the height direction (Y direction in the drawing). The groove 31a has a predetermined length. As shown in FIG. 3, the groove 31a has a track width Tw at the recording-medium-opposing face.

A magnetic pole unit 30 is formed in the groove 31a. The magnetic pole unit 30 consists of a lower magnetic pole layer 32, a nonmagnetic gap layer 33, and an upper magnetic pole layer 34 from the bottom.

The lower magnetic pole layer 32 is formed on the lower core layer 16 directly by plating. Preferably, the nonmagnetic gap layer 33 on the lower magnetic pole layer 32 is formed by plating a nonmagnetic material. Preferably, the gap layer 33 is composed of at least one material selected from the group consisting of NiP, NiPd, NiW, NiMo, Au, Pt, Rh, Pd, Ru, and Cr.

In a preferred embodiment of the present invention, the gap layer 33 is composed of NiP, which can maintain an adequate nonmagnetic state of the gap layer 33.

The magnetic pole unit 30 may have a double layer configuration including the nonmagnetic gap layer 33 and the upper magnetic pole layer 34.

A gap-defining layer 37 is formed on the gap layer 33 to define the gap depth (Gd) from the recording-medium-opposing face to the front end of the gap-defining layer 37. The gap-defining layer 37 may be composed of, for example, an organic insulating material.

The upper magnetic pole layer 34 is magnetically coupled with an upper core layer 40 formed thereon.

When the gap layer 33 is composed of a nonmagnetic metal material which is capable of plating, the lower magnetic pole layer 32, the gap layer 33, and the upper magnetic pole layer 34 can be continuously formed by plating.

Referring to FIG. 4, a spiral coil layer 38 is formed on the insulating layer 31 by patterning. The coil layer 38 is covered with an organic insulating layer 39.

Referring to FIG. 3, the insulating layer 31 has inclined planes 31c extending from both top edges of the groove 31a in the track width direction (X direction in the drawing) such that the width in the track width direction of the space on the groove 31a gradually increases from the bottom.

As shown in FIG. 4, the leading portion 40a of the upper core layer 40 is formed over the upper magnetic pole layer 34 and the inclined planes 31c of the insulating layer 31.

Referring to FIG. 4, the upper core layer 40 extends from the recording-medium-opposing face to the backside in the height direction (Y direction in the drawing) to cover the insulating layer 39, and the base 40b of the upper core layer 40 is in direct contact with the lower core layer 16.

In the second embodiment shown in FIGS. 3 and 4, the lower magnetic pole layer 32 and/or the upper magnetic pole layer 34 is composed of an $Fe_XCo_Y\alpha_Z$ alloy wherein α is at least one element selected from the group consisting of Rh, Pd, Pt, Ru, and Ir, the ratio X/Y by mass percent of Fe to Co is in the range of 2 to 5, the α content Z is in the range of 0.5 to 18 mass percent, and X+Y+Z=100 mass percent. An FeCoα alloy having the above composition has a saturation magnetic flux density Bs of at least 2.0 T, and higher corrosion resistance compared with an FeCo alloy not containing the element α.

In the present invention, preferably, the ratio X/Y by mass percent of Fe to Co is in the range of 2.6 to 4.3 and the α content Z is in the range of 3 to 9 mass percent to achieve a saturation magnetic flux density Bs of at least 2.2 T and higher corrosion resistance than that of an FeCo alloy not containing α.

In the present invention, the soft magnetic film may have a composition represented by the formula $Fe_XCo_Y\alpha_Z\beta_V$, wherein β is at least one of Ni and Cr, the ratio X/Y by mass percent of Fe to Co is in the range of 2 to 5 and preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The upper magnetic pole layer 34 and/or the lower magnetic pole layer 32 comprising an FeCoαβ alloy having such a composition exhibit a saturation magnetic flux density Bs of at least 2.0 T or at least 2.2 T under optimized conditions. Further more, the element β contributes to higher corrosion resistance due to the formation of a passivation film. In addition, use of Ni as the element β effectively decreases film stress.

Since the FeCoα or FeCoαβ alloy according to the present invention has a saturation magnetic flux density Bs of at least 2.0 T, the upper magnetic pole layer 34 and/or the lower magnetic pole layer 32 composed of the FeCoα or FeCoαβ alloy concentrates the magnetic flux to the vicinity of the gap, increasing the recording density. Furthermore, the thin-film magnetic head has higher corrosion resistance than that using an FeCo alloy not containing the noble metal α. Thus, a thin-film magnetic head having high corrosion resistance can be produced using the FeCoα or FeCoαβ alloy. Preferably, the saturation magnetic flux density Bs is at least 2.2 T.

Since an FeCoα or FeCoαβ alloy having the above composition forms a dense crystal phase, the film surface is smooth, further enhancing corrosion resistance. In the present invention, the center line average roughness Ra of the film surface is 10 nm or less and the coercive force Hc is 2,000 A/m or less.

In the embodiments shown in FIGS. 1 to 4, the magnetic pole unit 18 or 30 is formed between the lower core layer 16 and the base 22b or between the lower core layer 16 and the upper core layer 40, respectively. Furthermore, the lower magnetic pole layer 19 or 32 and/or the upper magnetic pole layer 21 or 34 constituting the magnetic pole unit 18 or 30, respectively, is composed of an $Fe_XCo_Y\alpha_Z$ alloy wherein α is at least one element selected from the group consisting of Rh, Pd, Pt, Ru, and Ir, the ratio X/Y by mass percent of Fe to Co is in the range of 2 to 5 and preferably 2.6 to 4.3, the α content Z is in the range of 0.5 to 18 mass percent and preferably 3 to 9 mass percent, and X+Y+Z=100 mass percent, or composed of an $Fe_XCo_Y\alpha_Z\beta_V$ alloy wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent. More preferably, the upper magnetic pole layers 21 and 34 are formed of the $Fe_XCo_Y\alpha_Z$ or $Fe_XCo_Y\alpha_Z\beta_V$ alloy and the upper core layers 22 and 40 are formed by plating a NiFe alloy.

It is preferable that the upper core layers 22 and 40 have high specific resistance rather than have high saturation magnetic flux density Bs. In order to introduce recording magnetic field from the upper core layers 22 and 40 to the upper magnetic pole layers 21 and 34, respectively, in a recording mode at a high-frequency band, the eddy current loss in the upper core layers 22 and 40 must be suppressed. Thus, the use of a NiFe alloy having higher specific resistance in the upper core layers 22 and 40 is advantageous for higher-density recording. An exemplary NiFe alloy has a composition of $Ni_{80}Fe_{20}$.

In the present invention, the upper magnetic pole layers 21 and 34 are composed of an FeCoα or FeCoαβ alloy and the upper core layers 22 and 40 are composed of a NiFe alloy. Thus, the upper magnetic pole layers 21 and 34 are not dissolved during the formation of the upper core layers 22 and 40, respectively, by electroplating.

The element α in the present invention is a noble metal, which is barely ionized, such as Rh, Pd, Pt, Ru, or Ir. Thus, the upper magnetic pole layers 21 and 34 containing such an element is barely ionized.

If the upper magnetic pole layers 21 and 34 are composed of an FeCoαβ alloy, Ni or Cr, which readily forms a passivation film, more effectively suppresses ionization of the constituents in the upper magnetic pole layers 21 and 34. Thus, the resulting magnetic pole has a high saturation magnetic flux density Bs and high corrosion resistance.

Preferably, the lower magnetic pole layers 19 and 32 are also composed of an FeCoα or FeCoαβ alloy to effectively suppress ionization of the constituents in the lower magnetic pole layers 19 and 32, respectively, during the formation of the upper core layers 22 and 40, respectively, by plating.

In the present invention, the lower magnetic pole layers 19 and 32 and/or the upper magnetic pole layers 21 and 34 may have a multilayer configuration including two or more layers. In such a configuration, preferably, the magnetic layers in contact with the gap layer 20 or the gap layer 33 are composed of an FeCoα or FeCoαβ alloy having the above composition in order to concentrate the magnetic flux to the vicinity of the gap. A thin-film magnetic head suitable for future higher-recording density is thereby produced.

The other magnetic layers not in contact with the gap layer 20 or 33 may be formed of any magnetic material; however, the saturation magnetic flux density Bs of these magnetic layers are preferably lower than the saturation magnetic flux density Bs of the magnetic layers in contact with the gap layer 20 or 33. For example, the other magnetic layers not in contact with the gap layer 20 or 33 are preferably composed of a NiFe alloy. A recording magnetic field is adequately introduced to the magnetic layers in contact with the gap layer 20 or 33, resulting in higher-recording density. Furthermore, the magnetic layers in contact with the gap layer 20 or 30 are prevented from ionization during the formation of the other magnetic layers not in contact with the gap layer 20 or 30 by plating.

The other magnetic layers may not be formed of the NiFe alloy and may be formed of an FeCoα or FeCoαβ alloy. Preferably, the composition of the material for the other magnetic layers is optimized so that the other magnetic layers have a saturation magnetic flux density Bs which is lower than that of the magnetic layer in contact with the gap layer 20 or 33. That is, the Fe content of the other magnetic layers is lower than that of the magnetic layers in contact with the gap layer 20 or 30.

It is preferable that the saturation magnetic flux density Bs of the lower magnetic pole layers 19 and 32 is preferably high. However, when the saturation magnetic flux density Bs of the lower magnetic pole layers 19 and 32 is lower than the saturation magnetic flux density Bs of the upper magnetic pole layers 21 and 34, the writing density of signals on the recording medium increases by reversion of a leakage magnetic field between the lower magnetic pole layer and the upper magnetic pole layer.

Figure 5:
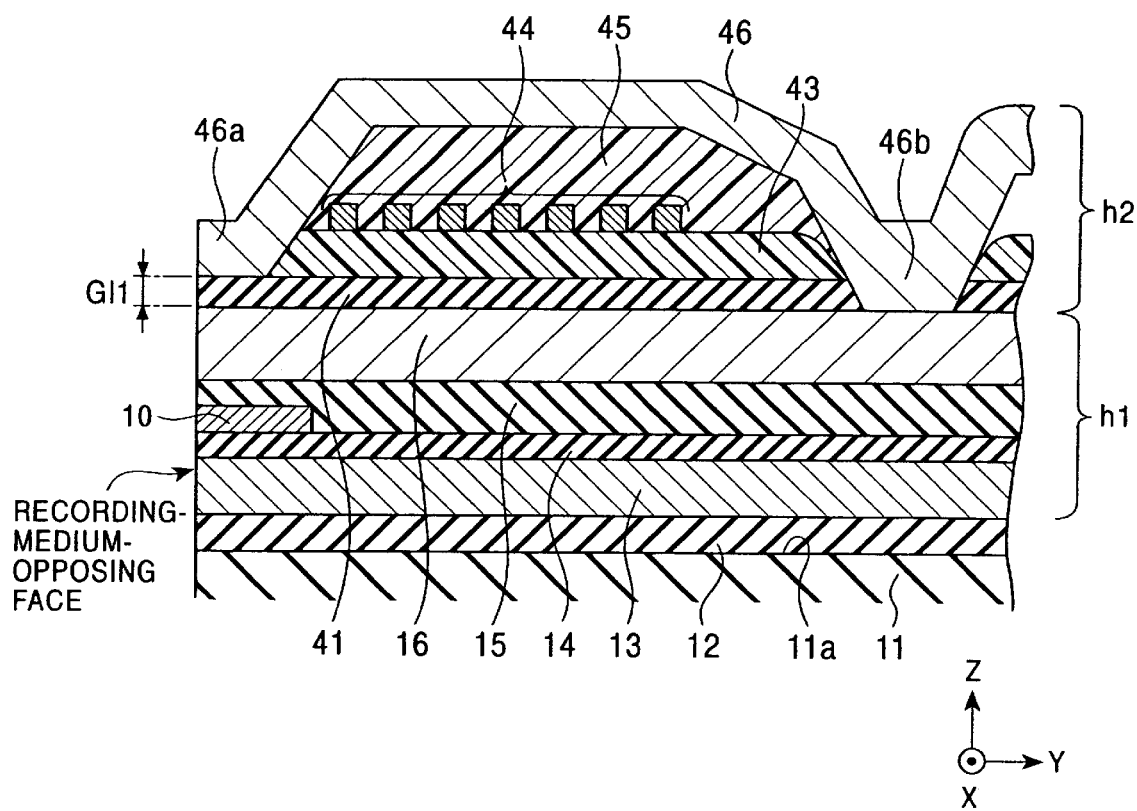
FIG. 5 is a longitudinal cross-sectional view of a thin-film magnetic head according to a third embodiment of the present invention.

FIG. 5 is a longitudinal cross-sectional view of a thin-film magnetic head according to a third embodiment of the present invention.

In the third embodiment, the MR head h1 has the same as that in FIG. 1. Referring to FIG. 5, a magnetic gap layer (nonmagnetic layer) 41 composed of, for example, alumina is formed on the lower core layer 16. An insulating layer 43 of polyimide or resist is formed on the magnetic gap layer 41, and a spiral coil layer 44 is formed on the resist 43. The coil layer 44 is composed of a nonmagnetic conductive material such as copper.

The coil layer 44 is surrounded by an insulating layer 45 of polyimide or resist, and an upper core layer 46 of a soft magnetic material is formed on the insulating layer 45.

The leading portion 46a of the upper core layer 46 faces the lower core layer 16 and is separated by the magnetic gap layer 41 at the recording-medium-opposing face to define a magnetic gap with a gap length Gl1. The base 46b of the upper core layer 46 is magnetically coupled with the lower core layer 16.

In the present invention, the lower core layer 16 and/or the upper core layer 46 is composed of an $Fe_XCo_Yα_Z$ alloy wherein α is at least one element selected from the group consisting of Rh, Pd, Pt, Ru, and Ir, the ratio X/Y by mass percent of Fe to Co is in the range of 2 to 5, the α content Z is in the range of 0.5 to 18 mass percent, and X+Y+Z=100 mass percent. An FeCoα alloy having the above composition has a saturation magnetic flux density Bs of at least 2.0 T, and higher corrosion resistance compared with an FeCo alloy not containing the element α.

In the present invention, preferably, the ratio X/Y by mass percent of Fe to Co is in the range of 2.6 to 4.3 and the α content Z is in the range of 3 to 9 mass percent to achieve a saturation magnetic flux density Bs of at least 2.2 T and higher corrosion resistance than that of an FeCo alloy not containing α.

In the present invention, the soft magnetic film may have a composition represented by the formula $Fe_XCo_Yα_Zβ_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The upper core layer 46 and/or the lower core layer 16 comprising an FeCoαβ alloy having such a composition exhibit a saturation magnetic flux density Bs of at least 2.0 T or at least 2.2 T under optimized conditions. Furthermore, the element β contributes to higher corrosion resistance due to the formation of a passivation film. In addition, use of Ni as the element β effectively decreases film stress.

Since the FeCoα or FeCoαβ alloy according to the present invention has a saturation magnetic flux density Bs of at least 2.0 T, the upper core layer 46 and/or the lower core layer 16 composed of the FeCoα or FeCoαβ alloy concentrates the magnetic flux to the vicinity of the gap, increasing the recording density. Furthermore, the thin-film magnetic head has higher corrosion resistance than that using an FeCo alloy not containing the noble metal α. Thus, a thin-film magnetic head having high corrosion resistance can be produced using the FeCoα or FeCoαβ alloy.

Since an FeCoα or FeCoαβ alloy having the above composition forms a dense crystal phase, the film surface is smooth, further enhancing corrosion resistance. In the present invention, the center line average roughness Ra of the film surface is 10 nm or less and the coercive force Hc is 2,000 A/m or less.

Furthermore, an FeCoα alloy having the above composition exhibits a specific resistance of 15 $\mu\Omega\cdot cm$ or more and a film stress of 400 MPa or less. In addition, this alloy has an anisotropic magnetic field Hk comparable with that of a NiFe-based alloy, which is conventionally used as a soft magnetic material.

Figure 6:
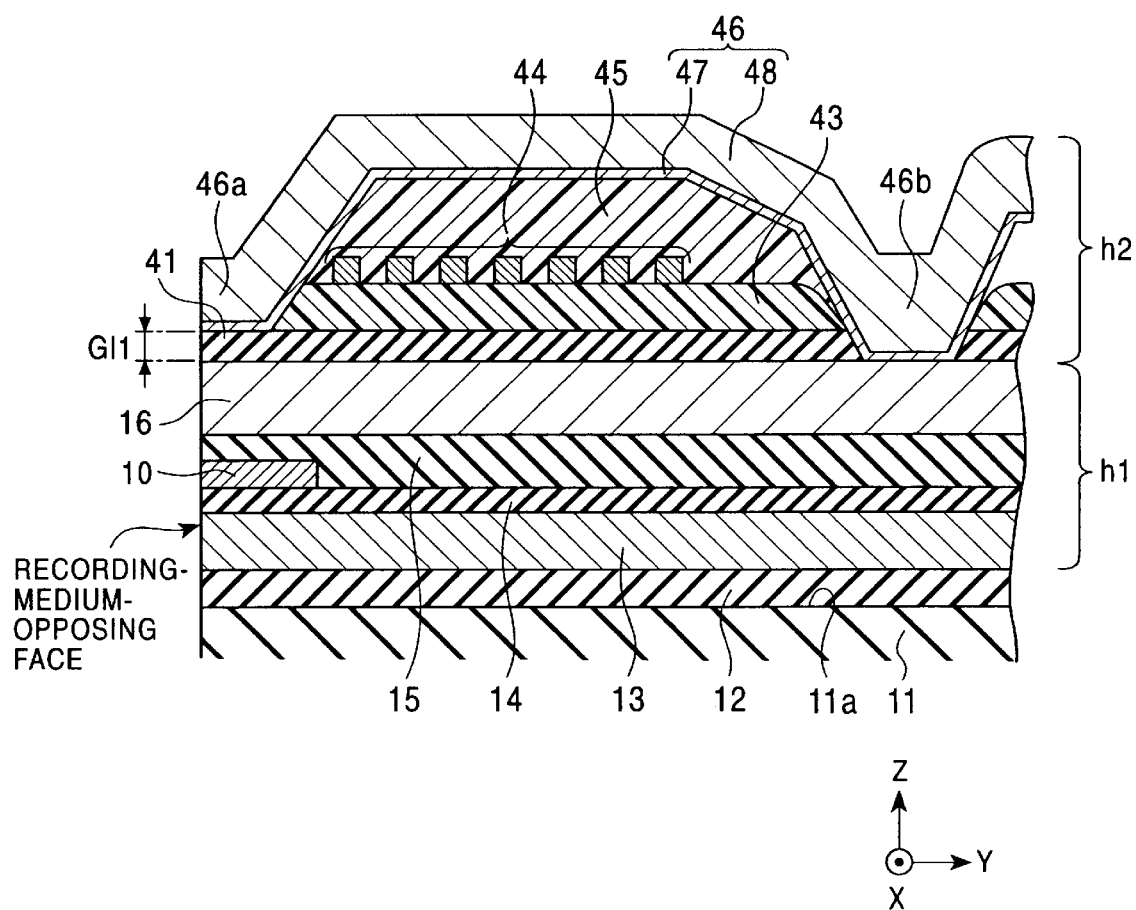
FIG. 6 is a longitudinal cross-sectional view of a thin-film magnetic head according to a fourth embodiment of the present invention.

FIG. 6 is a longitudinal cross-sectional view of a thin-film magnetic head according to a fourth embodiment of the present invention. In this embodiment, the upper core layer 46 includes two magnetic sublayers, in contrast to FIG. 5.

The upper core layer 46 includes a high Bs sublayer 47 having a high saturation magnetic flux density Bs and an overlying sublayer 48 formed on the high Bs sublayer 47.

The high Bs sublayer 47 and/or the lower core layer 16 is composed of an $Fe_XCo_Y\alpha_Z$ alloy wherein α is at least one element selected from the group consisting of Rh, Pd, Pt, Ru, and Ir, the ratio X/Y by mass percent of Fe to Co is in the range of 2 to 5, the α content Z is in the range of 0.5 to 18 mass percent, and X+Y+Z=100 mass percent. An FeCoα alloy having the above composition has a saturation magnetic flux density Bs of at least 2.0 T, and higher corrosion resistance compared with an FeCo alloy not containing the element α.

In the present invention, preferably, the ratio X/Y by mass percent of Fe to Co is in the range of 2.6 to 4.3 and the α content Z is in the range of 3 to 9 mass percent to achieve a saturation magnetic flux density Bs of at least 2.2 T and higher corrosion resistance than that of an FeCo alloy not containing α.

In the present invention, the soft magnetic film may have a composition represented by the formula $Fe_XCo_Y\alpha_Z\beta_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The high Bs sublayer 47 and/or the lower core layer 16 comprising an FeCoαβ alloy having such a composition exhibit a saturation magnetic flux density Bs of at least 2.0 T or at least 2.2 T under optimized conditions. Further more, the element β contributes to higher corrosion resistance due to the formation of a passivation film. In addition, use of Ni as the element β effectively decreases film stress.

Since an FeCoα or FeCoαβ alloy having the above composition forms a dense crystal phase, the film surface is smooth, further enhancing corrosion resistance. In the present invention, the center line average roughness Ra of the film surface is 10 nm or less and the coercive force Hc is 2,000 A/m or less. Furthermore, an FeCoα alloy having the above composition exhibits a specific resistance of 15 $\mu\Omega$·cm or more and a film stress of 400 MPa or less.

The overlaying sublayer 48 constituting the upper core layer 46 has a lower saturation magnetic flux density Bs than that of the high Bs sublayer 47 and a higher specific resistance than that of the high Bs sublayer 47. For example, the overlying sublayer 48 is composed of a $Ni_{80}Fe_{20}$ alloy.

Although the NiFe alloy has a lower saturation magnetic flux density Bs, this alloy has a higher specific resistance, compared with the FeCoα or FeCoαβ alloy. Thus, the high Bs sublayer 47 having a higher saturation magnetic flux density Bs compared with the overlying sublayer 48 concentrates the magnetic flux to the vicinity of the gap, resulting in higher recording resolution. The overlying sublayer 48 may not be composed of the NiFe alloy and may be composed of, for example, an FeCoα alloy. In such a case, the composition of the overlying sublayer 48 must be adjusted such that the saturation magnetic flux density Bs of the overlying sublayer 48 is higher than the saturation magnetic flux density Bs of the high Bs sublayer 47. One possible method is a reduction in the Fe content in the overlying sublayer 48 relative to the high Bs sublayer 47.

The overlying sublayer 48 having high specific resistance reduces eddy current loss, which occurs as the recording frequency increases. Thus, a thin-film magnetic head including the overlying sublayer 48 is suitable for trends towards higher-recording frequencies.

As shown in FIG. 6, preferably, the high Bs sublayer 47 is the lower sublayer facing the magnetic gap layer 41. The high Bs sublayer 47 may be formed only below the leading portion 46a of the upper core layer 46 in direct contact with the magnetic gap layer 41.

Also the lower core layer 16 may have a double layer configuration including a high-Bs sublayer and a high-specific-resistance sublayer. In such a configuration, the high-Bs sublayer is deposited on the high-specific-resistance sublayer and opposes the upper core layer 46 with the magnetic gap layer 41 provided therebetween.

In the embodiment shown in FIG. 6, the upper core layer 46 has a double layer configuration. Alternatively, the upper core layer 46 may include three or more sublayers. In the multilayer configuration, the high Bs sublayer 47 is preferably in contact with the magnetic gap layer 41.

When the high Bs sublayer 47 is formed of an FeCoα or FeCoαβ alloy and the overlying sublayer 48 is formed of a NiFe alloy by electroplating, dissolution of the high Bs sublayer 47 is adequately prevented during the formation of the overlying sublayer 48, since the high Bs sublayer 47 contains a noble metal, which is barely ionized, such as Rh, Pt, Pd, Ru, or Ir, or contains Ni, which readily forms a passivation film, at the surface.

Figure 7:
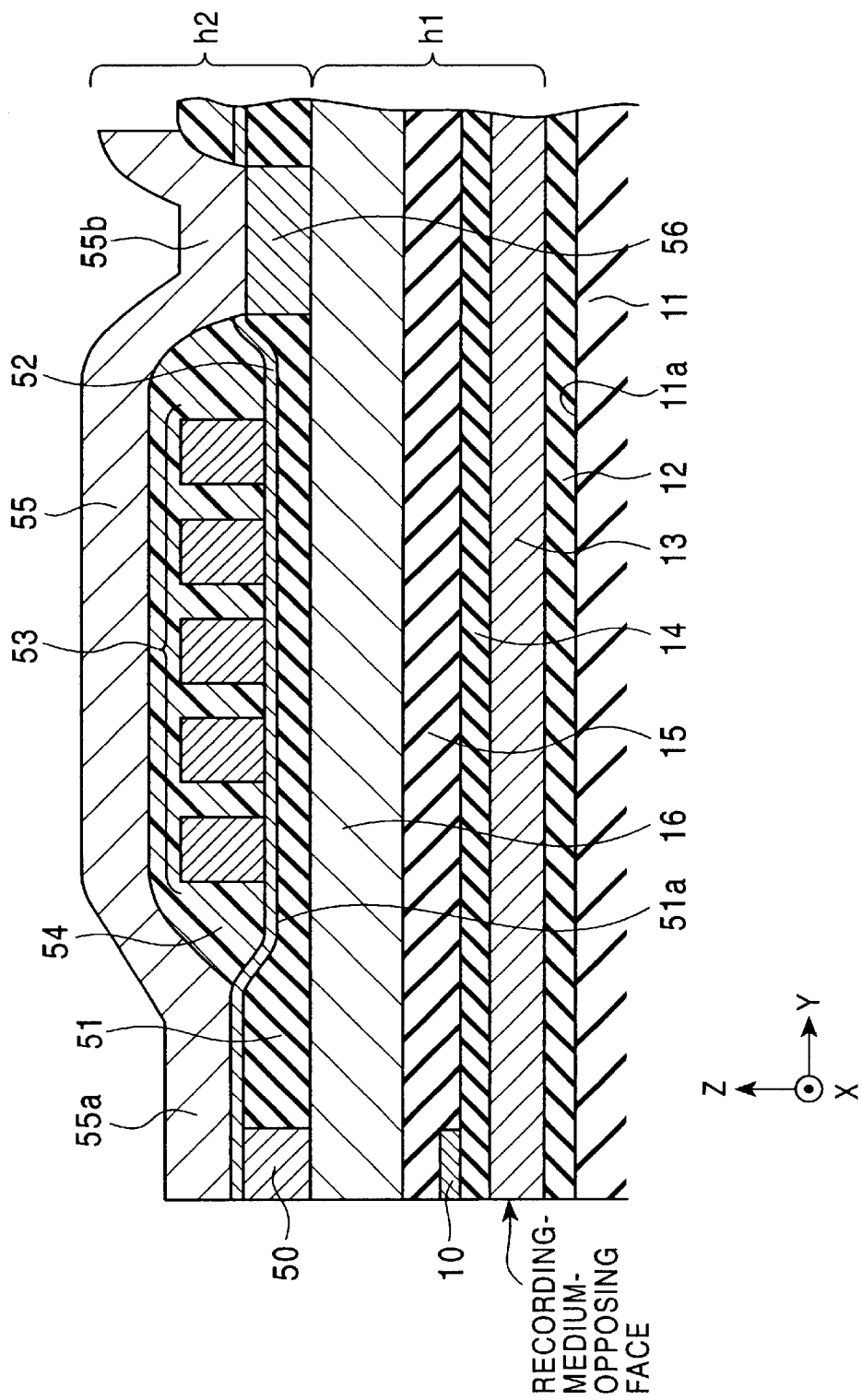
FIG. 7 is a longitudinal cross-sectional view of a thin-film magnetic head according to a fifth embodiment of the present invention.

FIG. 7 is a longitudinal cross-sectional view of a thin-film magnetic head according to a fifth embodiment of the present invention.

In the fifth embodiment, the MR head h1 has the same configuration as that shown in FIG. 1. Referring to FIG. 7, a lower magnetic pole layer 50 is formed at the recording-medium-opposing face on the lower core layer 16. An insulating layer 51 is formed behind the lower magnetic pole layer 50 in the height direction (Y direction in the drawing). The upper face of the insulating layer 51 is concave for forming a coil-forming face 51a.

A gap layer 52 is formed over the lower magnetic pole layer 50 and the insulating layer 51. A coil layer 53 is formed on the gap layer 52 above the coil-forming face 51a. The coil layer 53 is covered with an organic insulating layer 54.

A patterned upper core layer 55 is formed over the gap layer 52 and the nonmagnetic insulating layer 54, for example, by frame plating.

The leading portion 55a of the upper core layer 55 faces the lower magnetic pole layer 50 with the lower magnetic pole layer 50 therebetween. The base 55b of the upper core layer 55 is magnetically coupled with the lower core layer 16 via a bank layer 56 provided on the lower core layer 16.

In this embodiment, the upper core layer 55 and/or the lower magnetic pole layer 50 is composed of an $Fe_XCo_Y\alpha_Z$ alloy wherein α is at least one element selected from the group consisting of Rh, Pd, Pt, Ru, and Ir, the ratio X/Y by mass percent of Fe to Co is in the range of 2 to 5, the α content Z is in the range of 0.5 to 18 mass percent, and X+Y+Z=100 mass percent. An FeCoα alloy having the above composition has a saturation magnetic flux density Bs of at least 2.0 T, and higher corrosion resistance compared with an FeCo alloy not containing the element α.

In the present invention, preferably, the ratio X/Y by mass percent of Fe to Co is in the range of 2.6 to 4.3 and the α content Z is in the range of 3 to 9 mass percent to achieve a saturation magnetic flux density Bs of at least 2.2 T and higher corrosion resistance than that of an FeCo alloy not containing α.

In the present invention, the soft magnetic film may have a composition represented by the formula $Fe_XCo_Y\alpha_Z\beta_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The upper core layer 55 and/or the lower magnetic pole layer 50 comprising an FeCoαβ alloy having such a composition exhibit a saturation magnetic flux density Bs of at least 2.0 T or at least 2.2 T under optimized conditions. Further more, the element β contributes to higher corrosion resistance due to the formation of a passivation film. In addition, use of Ni as the element β effectively decreases film stress.

Since the FeCoα or FeCoαβ alloy according to the present invention has a saturation magnetic flux density Bs of at least 2.0 T, the lower magnetic pole layer 50 and/or the upper core layer 55 composed of the FeCoα or FeCoαβ alloy concentrates the magnetic flux to the vicinity of the gap, increasing the recording density. Furthermore, the thin-film magnetic head has higher corrosion resistance than that using an FeCo alloy not containing the noble metal α. Thus, a thin-film magnetic head having high corrosion resistance can be produced using the FeCoα or FeCoαβ alloy. Preferably, the saturation magnetic flux density Bs is at least 2.2 T.

Since an FeCoα or FeCoαβ alloy having the above composition forms a dense crystal phase, the film surface is smooth, further enhancing corrosion resistance. In the present invention, the center line average roughness Ra of the film surface is 10 nm or less and the coercive force Hc is 2,000 A/m or less. Furthermore, the FeCoα alloy having the above composition exhibits a specific resistance of 15 μΩ·cm or more and a film stress of 400 MPa or less.

In FIG. 7, when the lower magnetic pole layer 50 is composed of the FeCoα or FeCoαβ alloy which has a higher saturation magnetic flux density Bs than that of the lower core layer 16, the magnetic flux can be concentrated to the vicinity of the gap, thus increasing recording density.

The entire upper core layer 55 may be formed of the FeCoα or FeCoαβ alloy. Alternatively, the upper core layer 55 may have a multilayer configuration as in the upper core layer 46 shown in FIG. 6 and the sublayer in contact with the gap layer 52 may be formed of the FeCoα or FeCoαβ alloy having a high saturation magnetic flux density Bs. In such a case, preferably, only the leading portion 55a of the upper core layer 55 may have a multilayer configuration such that a high-Bs layer is in contact with the gap layer 52 in order to concentrate the magnetic flux to the vicinity of the gap and increase the recording density.

Preferably, the FeCoα alloy film and the FeCoαβ alloy film in the above embodiments are formed by plating. For example, these alloy films are formed by electroplating using a pulsed current.

The plating process facilitates the control of the thickness of the FeCoα or FeCoαβ alloy film and the formation of the alloy film with a higher thickness compared with sputtering processes.

In the above embodiments, the layer 16 functions as both the lower core layer and the upper shield layer. Alternatively, the lower core layer and the upper shield layer may be independently formed. In this case, the lower core layer and the upper shield layer are separated by an insulating layer.

A method for making the thin-film magnetic heads shown in FIGS. 1 to 7 will now be described.

The thin-film magnetic head shown in FIGS. 1 and 2 is formed as follows. The gap-defining layer 17 is formed on the lower core layer 16. Next, the lower magnetic pole layer 19, the nonmagnetic gap layer 20, and the upper magnetic pole layer 21 are deposited on the gap-defining layer 17 by continuous plating using a resist to form the magnetic pole unit 18 extending from the recording-medium-opposing face to the backside in the height direction. After the insulating layer 23 is formed behind the magnetic pole unit 18 in the height direction, the magnetic pole unit 18 and the insulating layer 23 are planarized by a chemical-mechanical polishing (CMP) process. The spiral coil layer 24 is formed on the insulating layer 23 by patterning, and then the insulating layer 25 is formed on the coil layer 24. The upper core layer 22 is formed over the magnetic pole unit 18 and the insulating layer 25, for example, by flame plating.

The thin-film magnetic head shown in FIGS. 3 and 4 is formed as follows. After the insulating layer 31 is formed on the lower core layer 16, the groove 31a is formed in the insulating layer 31 using a resist so as to extend from the recording-medium-opposing face to the backside in the height direction. The inclined planes 31c shown in FIG. 3 are formed on the groove 31a.

The lower magnetic pole layer 32 and the nonmagnetic gap layer 33 are formed in the groove 31a. After the gap-defining layer 37 is formed over the gap layer 33 and the insulating layer 31, the upper magnetic pole layer 34 is formed on the gap layer 33 by plating. After the spiral coil layer 38 is formed on the insulating layer 31 by patterning, the insulating layer 39 is formed on the coil layer 38. The upper core layer 40 is formed over the upper magnetic pole layer 34 and the insulating layer 39, for example, by flame plating.

The thin-film magnetic head shown in FIGS. 5 and 6 is formed as follows. After the magnetic gap layer 41 is formed on the lower core layer 16, the insulating layer 43 is formed on the magnetic gap layer 41. The coil layer 44 is formed on the insulating layer 43 by patterning. After the insulating layer 45 is formed on the coil layer 44, the upper core layer 46 is formed over the magnetic gap layer 41 and the insulating layer 45 by flame plating.

The thin-film magnetic head shown in FIG. 7 is formed as follows. The lower magnetic pole layer 50 is formed on the lower core layer 16 using a resist, and the insulating layer 51 is formed behind the lower magnetic pole layer 50 in the height direction. After the lower magnetic pole layer 50 and the insulating layer 51 are planarized by a CMP process, the indented coil-forming face 51a is formed on the planarized top face of the magnetic gap layer 41. The gap layer 52 is formed over the lower magnetic pole layer 50 and the insulating layer 51, and then the spiral coil layer 53 is formed on the gap layer 52 by patterning. The nonmagnetic insulating layer 54 is formed on the coil layer 53. The upper core layer 55 is formed over the gap layer 52 and the nonmagnetic insulating layer 54, for example, by flame plating.

A method for plating the $Fe_XCo_Y\alpha_Z$ alloy will now be described. As described above, this alloy has the following composition. The element α is at least one noble metal selected from the group consisting of Rh, Pd, Pt, Ru, and Ir, the ratio X/Y by mass percent of Fe to Co is in the range of 2 to 5, the α content Z is in the range of 0.5 to 18 mass percent, and X+Y+Z=100 mass percent.

The $Fe_XCo_Y\alpha_Z$ alloy layer is formed by electroplating.

In general, the electroplating uses a continuous DC or a pulsed current. In the present invention, electroplating using a continuous DC may be employed.

In the present invention, however, electroplating using a pulsed current is preferable for the following reason.

In electroplating using a pulsed current, an operation time for energizing the system and a dead time for suspending the energizing are repeated during the plating process, for example, by ON/OFF switching using a current control element. By introducing the dead time, the $Fe_XCo_Y\alpha_Z$ alloy film is gradually deposited during the plating process, and the current density in the system becomes more uniform compared with plating by a continuous DC.

Preferably, the duty ratio is in the range of about 0.1 to 0.5. Such a duty ratio is achieved by repeating the ON/OFF switching at cycle of several seconds. The pulsed current condition affects the average crystal grain size in the $Fe_XCo_Y\alpha_Z$ alloy and the center line average roughness Ra of thee film.

As described above, pulsed-current plating moderates an uneven distribution of the current density during the plating process.

In the present invention, the Fe ion concentration is in the range of 1.2 to 3.2 g/liter, the Co ion concentration is in the range of 0.86 to 1.6 g/liter, and the $\alpha$ ion concentration is in the range of 0.2 to 6 mg/liter. As shown in the experimental results below, by controlling these ion concentrations, the ratio X/Y of Fe to Co can be set within the range of 2 to 5 and the $\alpha$ content Z can be set within the range of 0.5 to 18 mass percent in the plated $Fe_XCo_Y\alpha_Z$ alloy.

In the above plating bath composition, the Fe ion concentration is lower than that in conventional bath compositions. For example, a typical conventional bath composition has an Fe ion concentration of about 4.0 g/liter. In the present invention, the Fe ion concentration is decreased to enhance the stirring efficiency. As a result, the FeCo$\alpha$ alloy film can have an increased Fe content and can contain dense crystals, resulting in high corrosion resistance.

In the plated $Fe_XCo_Y\alpha_Z$ alloy, preferably, the ratio X/Y by mass percent of Fe to Co is in the range of 2.6 to 4.3 and the $\alpha$ content Z is in the range of 3 to 9 mass percent. Such a composition is readily achieved by adjusting the above plating bath composition. The plated $Fe_XCo_Y\alpha_Z$ alloy having the preferable composition exhibits a saturation magnetic flux density Bs of at least 2.2 T.

In the present invention, the plating bath may contain $\beta$ ions to form an $Fe_XCo_Y\alpha_Z\beta_V$ alloy by plating. Preferably, the $\beta$ ion concentration in the plating bath is in the range of 0.3 g/liter to 1 g/liter. The $\beta$ content V can be thereby controlled within the range of 0.5 to 5 mass percent in the plated $Fe_XCo_Y\alpha_Z\beta_V$ alloy.

Preferably, the plating bath composition for forming the FeCo$\alpha$ or FeCo$\alpha\beta$ alloy contains sodium saccharine ($C_6H_4CONNaSO_2$). Sodium saccharine functions as a stress relaxant to decrease the film stress of the plated FeCo$\alpha$ or FeCo$\alpha\beta$ alloy.

Alternatively, the plating bath composition for forming the FeCo$\alpha$ or FeCo$\alpha\beta$ alloy may contain 2-butyne-1,4-diol. This compound suppresses coarsening of the crystal grains in the plated alloy and thus reduces the coercive force Hc of the alloy.

Alternatively, the plating bath composition for forming the FeCo$\alpha$ or FeCo$\alpha\beta$ alloy may contain sodium 2-ethylhexyl sulfate.

Sodium 2-ethylhexyl sulfate is a surfactant. This compound removes hydrogen which is generated during the plating process for forming the FeCo$\alpha$ or FeCo$\alpha\beta$ alloy. Hydrogen trapped on the surface of the plated film precludes the formation of dense crystals, resulting in roughening of the surface. Since hydrogen is removed from the surface of the plated film in the present invention, the plated film has a smooth surface and thus a small coercive force Hc.

Sodium 2-ethylhexyl sulfate may be replaced with sodium laurylsulfate; however, bubbling readily occurs in the plating bath containing sodium laurylsulfate compared with the plating bath containing sodium 2-ethylhexyl sulfate. Thus, it is difficult to determine the content of sodium laurylsulfate not causing bubbling. Accordingly, sodium 2-ethylhexyl sulfate which barely causes bubbling is preferably added in an amount which can effectively remove hydrogen.

The plating bath preferably contains boric acid. Boric acid functions as a pH buffer at the electrode surface and is effective for the formation of a glossy plated surface.

The core layer(s) and the magnetic pole layer(s) in FIGS. 1 to 7 are formed by the above-described method for plating the soft magnetic film.

A thin-film magnetic head including the core layer(s) and the magnetic pole layer(s) can be readily formed with high reproducibility by the above method. These layers have the following composition: the ratio X/Y by mass percent of Fe to Co is in the range of 2 to 5 and more preferably in the range of 2.6 to 4.3, the $\alpha$ content Z is in the range of 0.5 to 18 mass percent and more preferably in the range of 3 to 9 mass percent, the $\beta$ content V is in the range of 0.5 to 5 mass percent, and X+Y+Z+V=100 mass percent. The thin-film magnetic head exhibits a saturation magnetic flux density Bs of at least 2.0 T suitable for higher-density recording, and high corrosion resistance.

The FeCo$\alpha$ alloy and the FeCo$\alpha\beta$ alloy in the present invention may be used in any application, for example, planar magnetic elements such as thin-film inductors, in addition to the thin-film magnetic heads shown in FIGS. 1 to 7.

EXAMPLES

FeCoPd alloys having various compositions were formed by pulsed-current plating in plating baths containing the following components to examine the relationship between the alloy composition and the saturation magnetic flux density Bs.

Components in Plating Bath (1) $FeSO_4 \cdot 7H_2O$: 6 to 16 g/liter (Fe ion concentration: 1.2 to 3.2 g/liter)

(2) $CoSO_4 \cdot 7H_2O$: 4.1 to 7.6 g/liter (Co ion concentration: 0.86 to 1.6 g/liter)

(3) $PdCl_2$ 0 to 10 mg/liter (Pd ion concentration: 0 to 6 mg/liter)

(4) sodium saccharine: 2 g/liter (5) sodium chloride: 25 g/liter (6) boric acid: 25 g/liter (7) sodium 2-ethylhexyl sulfate: 0.15 ml/liter Each film was deposited under the following common conditions.

The pH value of the electrode was 2.3. The duty (ON/OFF) ratio of the pulsed current was 500/500 ms, and the current was 500 to 1,000 mA.

After a Cu underlayer was formed on a Si substrate by sputtering, an FeCoPd or FeCo alloy layer with a thickness in the range of 0.5 $\mu$m to 1 $\mu$m was plated on the Cu underlayer in each plating bath.

The results are shown in Table 1.

TABLE 1

| Sample | Content (mass percent) | | | Fe/Co Ratio | Bs* |
| --- | --- | --- | --- | --- | --- |
| | Fe | Co | Pd | | |
| 1 | 64 | 36 | 0 | 1.78 | 2.01 |
| 2 | 72 | 28 | 0 | 2.57 | 2.22 |
| 3 | 73 | 27 | 0 | 2.7 | 2.21 |
| 4 | 73 | 27 | 0 | 2.7 | 2.23 |
| 5 | 77 | 23 | 0 | 3.35 | 2.27 |
| 6 | 77 | 23 | 0 | 3.35 | 2.28 |
| 7 | 80 | 20 | 0 | 4 | 2.2 |
| 8 | 82 | 18 | 0 | 4.56 | 2.2 |
| 9 | 83 | 17 | 0 | 4.88 | 2.11 |
| 10 | 84 | 16 | 0 | 5.25 | 2.01 |
| 11 | 78.72 | 20.78 | 0.5 | 3.78 | 2.18 |
| 12 | 70.41 | 27.95 | 1.64 | 2.52 | 2.28 |
| 13 | 67.84 | 30.08 | 2.08 | 2.26 | 2.1 |
| 14 | 80.75 | 17.03 | 2.22 | 4.74 | 2.05 |
| 15 | 76.92 | 20.63 | 2.45 | 3.73 | 2.22 |
| 16 | 64.33 | 32.88 | 2.79 | 1.96 | 2 |
| 17 | 73.1 | 24.01 | 2.89 | 3.04 | 2.25 |
| 18 | 72 | 25 | 3 | 2.88 | 2.25 |
| 19 | 75.03 | 21.74 | 3.23 | 3.45 | 2.24 |
| 20 | 70.93 | 25.82 | 3.25 | 2.75 | 2.22 |
| 21 | 65.02 | 31.28 | 3.7 | 2.08 | 2.17 |
| 22 | 76.92 | 19.3 | 3.78 | 3.99 | 2.21 |
| 23 | 68.33 | 27.31 | 4.36 | 2.5 | 2.1 |
| 24 | 68 | 27 | 5 | 2.52 | 2.26 |
| 25 | 70 | 25 | 5 | 2.8 | 2.21 |
| 26 | 72.11 | 22.39 | 5.5 | 3.22 | 2.23 |
| 27 | 75.3 | 19.2 | 5.5 | 3.92 | 2.22 |
| 28 | 57.27 | 35.29 | 7.44 | 1.62 | 2.18 |
| 29 | 68.54 | 23.36 | 8.1 | 2.93 | 2.17 |
| 30 | 65.37 | 25.63 | 9 | 2.55 | 2.18 |
| 31 | 73.99 | 17.01 | 9 | 4.35 | 2.09 |
| 32 | 63.51 | 26.59 | 9.9 | 2.39 | 2.11 |
| 33 | 55.55 | 26.9 | 17.55 | 2.07 | 2.01 |

Figure 8:
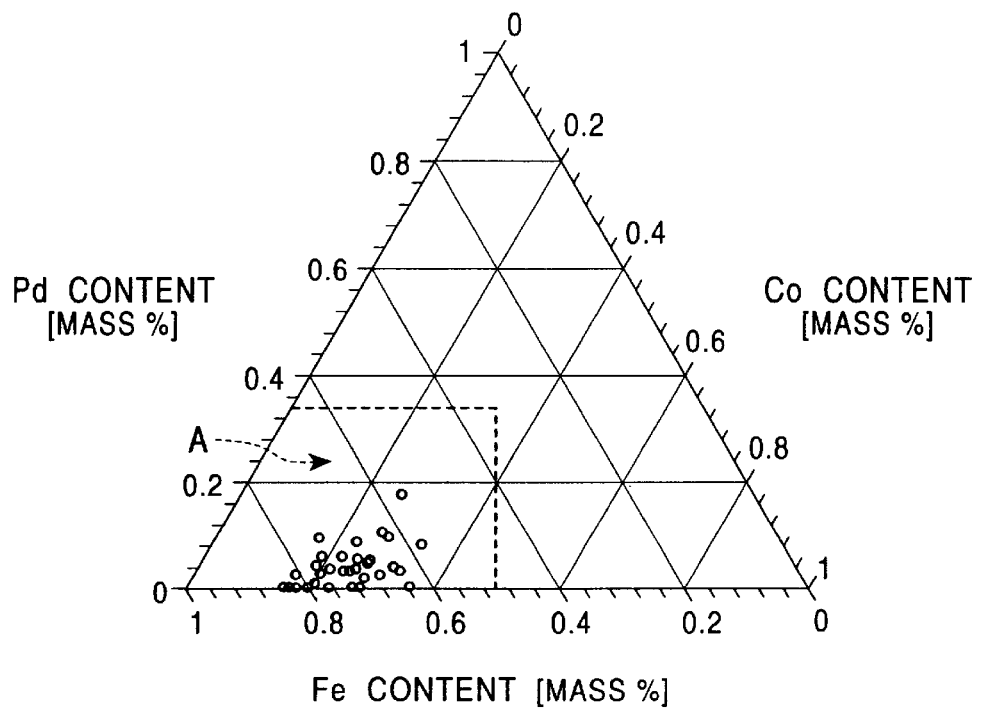
FIG. 8 is a ternary diagram illustrating the relationship between the composition and the saturation magnetic flux density of FeCoPd alloys and FeCo alloys which are formed by electroplating.

FIG. 8 is a ternary diagram illustrating the relationship between the Fe, Co, and Pd contents and the saturation magnetic flux density Bs that are shown in Table 1.

Figure 9:
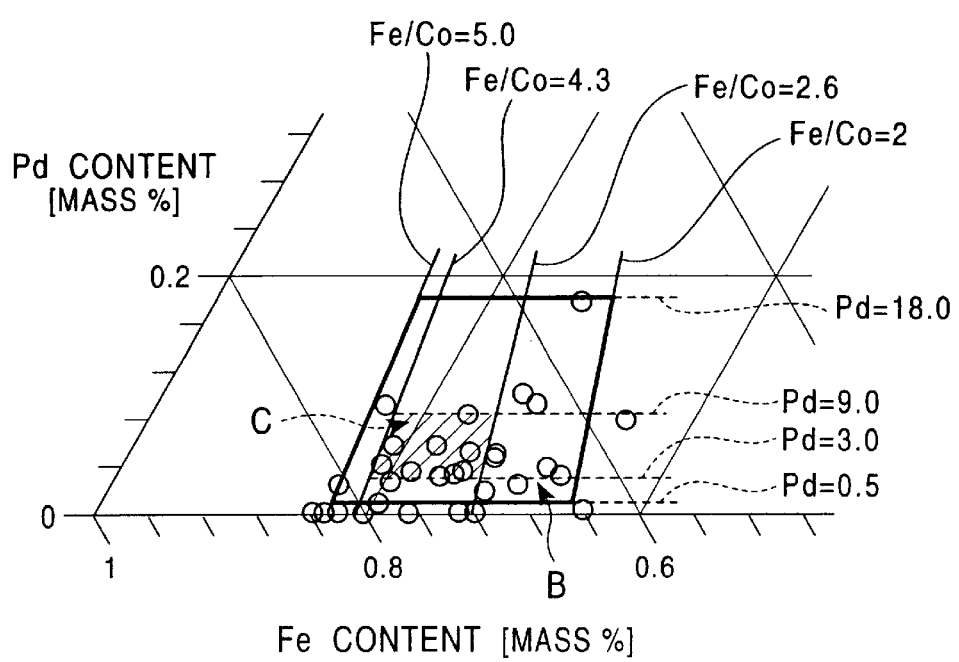
FIG. 9 is a partial enlarged ternary diagram corresponding to Region A in FIG. 8.

FIG. 9 is a partial enlarged ternary diagram corresponding to Region A in FIG. 8.

The results shown in Table 1 and FIGS. 8 and 9 demonstrate that each soft magnetic film exhibits a saturation magnetic flux density Bs of at least 2.0 T and high corrosion resistance compared with FeCo alloys not containing PD, when the film comprises a composition which is within Region B surrounded by a line corresponding to the Fe/Co (X/Y) ratio by mass percent of 5, a line corresponding to the Fe/Co (X/Y) ratio by mass percent of 2, a line corresponding to the Pd content of 18 mass percent, and a line corresponding to the Pd content of 0.5 mass percent.

Also the results demonstrate that each soft magnetic film exhibits a saturation magnetic flux density Bs of at least 2.2 T and high corrosion resistance compared with FeCo alloys not containing Pd, when the film comprises compositions which are within Region B surrounded by a line corresponding to the Fe/Co (X/Y) ratio by mass percent of 4.3, a line corresponding to the Fe/Co (X/Y) ratio by mass percent of 2.6, a line corresponding to the Pd content of 9 mass percent, and a line corresponding to the Pd content of 3 mass percent.

The preferable Fe/Co (X/Y) ratio by mass percent was determined based on the saturation magnetic flux density Bs.

Figure 10:
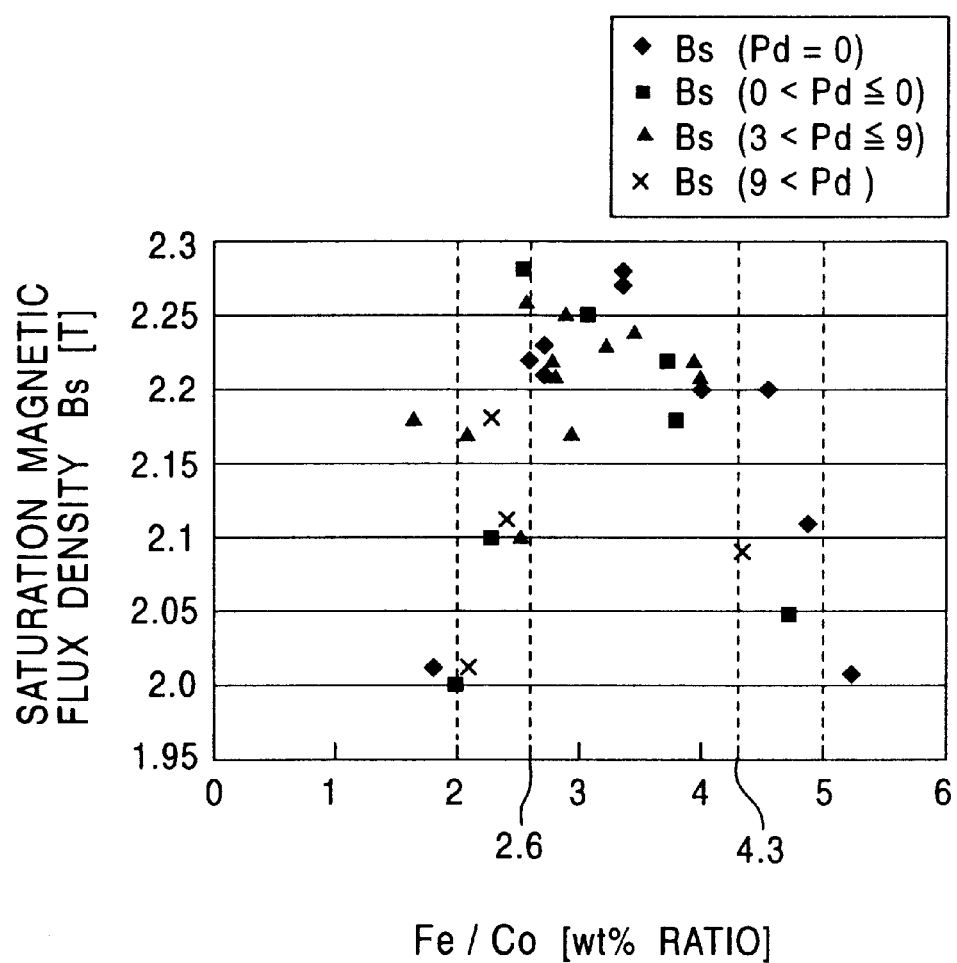
FIG. 10 is a graph illustrating the relationship between the Fe/Co ratio by mass percent and the saturation magnetic flux density.

FIG. 10 is a graph illustrating the relationship between the Fe/Co ratio by mass percent and the saturation magnetic flux density of samples shown in Table 1.

FIG. 10 shows that the alloy has a saturation magnetic flux density Bs of at least 2.0 at an Fe/Co (X/Y) ratio in the range of 2 to 5.

FIG. 10 also shows that the alloy has a saturation magnetic flux density Bs of at least 2.2 at an Fe/Co (X/Y) ratio in the range of 2.6 to 4.3.

The saturation magnetic flux density Bs also depends on the Pd content, as shown in FIG. 10. The saturation magnetic flux density Bs decreases with an increased Pd content due to a decreased content in magnetic elements Fe and Co even if the Fe/Co (X/Y) ratio is within the above range.

An adequate amount of Pd must be added to the FeCo alloy to enhance corrosion resistance.

Experiments were performed to determine the preferable Pd content.

The relationship between the Pd content in the FeCo alloy and the corrosion resistance was examined using six samples shown in Table 1. Each sample has the following layer configuration: $Fe_{20}Ni_{80}$ alloy film/soft magnetic film/NiP alloy film/$Fe_{60}Ni_{40}$ film.

Sample 2 ($Fe_{72}Co_{28}$ alloy), Sample 11 ($Fe_{78.72}Co_{20.78}Pd_{0.5}$ alloy), Sample 24 ($Fe_{68}Co_{27}Pd_5$ alloy), Sample 32 ($Fe_{63.51}Co_{26.59}Pd_{9.9}$ alloy), and Sample 33 ($Fe_{55.55}Co_{26.9}Pd_{17.55}$ alloy), these were listed in Table 1, were prepared by pulsed-current plating. Furthermore, Sample 34 ($Fe_{70}Ni_{30}$ alloy) was prepared.

Each sample was immersed into hot pure water (60° C.), pure water (45° C.), tap water (45° C.), or diluted sulfuric acid (pH=2, 45° C.) to evaluate corrosion resistance according to ten ranks of a cut cross section. Rank 10 means that the soft magnetic film is not corroded (highest corrosion resistance) whereas Rank 1 means that the soft magnetic film is almost completely corroded (lowest corrosion resistance).

The results are summarized in Table 2.

TABLE 2

| Sample | Composition of soft magnetic film | Hot pure water 60° C. | Pure water 45° C. | Tap water 45° C. | Sulfuric acid 45° C. |
| --- | --- | --- | --- | --- | --- |
| 2 | $Fe_{72}Co_{28}$ | 3 | 6 | 4 | 5 |
| 11 | $Fe_{78.72}Co_{20.78}Pd_{0.5}$ | 3 | 6 | 5 | 7 |
| 24 | $Fe_{68}Co_{27}Pd_5$ | 5 | 7 | 5 | 7 |
| 32 | $Fe_{63.51}Co_{26.59}Pd_{9.9}$ | 7 | 8 | 5 | 9 |
| 33 | $Fe_{55.55}Co_{26.9}Pd_{17.55}$ | 10 | 10 | 9 | 10 |
| 34 | $Fe_{70}Ni_{30}$ | 10 | 9 | 7 | 9 |

Table 2 shows that Sample 34 ($Fe_{70}Ni_{30}$ alloy) exhibits high corrosion resistance to all the solutions.

In contrast, Sample 2 ($Fe_{72}Co_{28}$ alloy) exhibits low corrosion resistance to hot pure water at 60° C. (Rank 3) and tap water at 45° C. (Rank 4) and in diluted sulfuric acid at 45° C. (Rank 5).

A possible reason for low corrosion resistance of the $Fe_{72}Co_{28}$ alloy soft magnetic film is as follows. When an $Fe_{60}Ni_{40}$ film is electroplated on the $Fe_{72}Co_{28}$ alloy film, a large potential difference (standard electrode potential difference) is generated between the FeCo alloy film and the NiFe alloy film causes dissolution of the FeCo alloy film by the galvanic effect.

In contrast, Sample 11 containing 0.5 mass percent Pd exhibits increased corrosion resistance to diluted sulfuric acid compared with Sample 2. Since diluted sulfuric acid is one of the solutions used in the slider making process, high corrosion resistance to diluted sulfuric acid facilitates the use of the diluted sulfuric acid in the slider making process.

Samples 24, 32, and 33 containing higher proportions of Pd exhibits higher corrosion resistance than that of Sample 2 not containing Pd. Among these, Sample 33 containing 17.55 mass percent Pd exhibits higher corrosion resistance than that of Sample 34 ($Fe_{70}Ni_{30}$ alloy).

As described above, the FeCoPd alloy film exhibits higher corrosion resistance than that of the FeCo alloy for the following reason. Pd is a noble metal, which is barely ionized. When an FeNi alloy is electroplated on the FeCoPd alloy, Pd in the alloy suppresses ionization of the alloy components and thus enhances corrosion resistance.

Table 2 suggests that the addition of 0.5 mass percent Pd outstandingly enhances the corrosion resistance of the FeCo alloy.

Sample 11 containing 0.5 mass percent Pd has an Fe/Co (X/Y) ratio by mass percent of about 3.78 and exhibits a saturation magnetic flux density Bs of about 2.18 T, as shown in Table 1.

As described above, in Sample 11, the ratio Fe/Co (X/Y) by mass percent is within the range of 2 to 5, the saturation magnetic flux density Bs is higher than 2.0 T, and the corrosion resistance is higher than that of the Pd-free soft magnetic film. Accordingly, the lower limit of the Pd content is determined to be 0.5 mass percent.

In Table 1, the Fe/Co (X/Y) ratio by mass percent of Sample 33 containing 17.55 mass percent Pd is about 2.07. As described above, the Fe/Co ratio is in the range of 2 to 5. The Fe/Co ratio of Sample 2 is about 2 and the Pd content is the highest among the samples tested. Thus, the Fe content is the lowest, namely, about 55.55 mass percent.

Sample 33 still exhibits a saturation magnetic flux density Bs above 2.0 T regardless of the lowest Fe content. This result suggests that a saturation magnetic flux density Bs exceeding 2.0 T can be achieved at an Fe/Co (X/Y) ratio in the range of 2 to 5.

Table 2 also shows that Sample 33 containing 17.55 mass percent Pd exhibits further enhanced corrosion resistance. Based on this result, the upper limit of the Pd content is determined to be 18 mass percent in the present invention.

Based on the above experimental results, in the present invention, the ratio X/Y by mass percent of Fe to Co is in the range of 2 to 5, the Pd content is in the range of 0.5 to 18 mass percent. A soft magnetic film comprising an alloy having such a composition exhibits a saturation magnetic flux density Bs of at least 2.0 T and higher corrosion resistance compared to an FeCo alloy not containing Pd.

Next, the Pd content when the ratio X/Y of Fe to Co by mass is in the range of 2.6 to 4.3 and a saturation magnetic flux density Bs of at least 2.2 T is achieved is determined.

As shown in Table 1, in Samples 15, 17, 18, 19, 20, 22, 25, 26, and 27, the ratio X/Y by mass percent of Fe to Co is in the range of 2.6 to 4.3 and the saturation magnetic flux density Bs exceeds 2.2 T. Moreover, Sample 30 exhibits a saturation magnetic flux density Bs which is slightly lower than 2.2 T. This result suggests that even an alloy containing a high Pd content of 9 mass percent exhibits a saturation magnetic flux density Bs near 2.2 T.

Accordingly, the Pd content is preferably in the range of 3 to 9 mass percent.

Based on the above experimental results, in the present invention, the preferable ratio X/Y by mass percent of Fe to Co is in the range of 2.6 to 4.3, the preferable Pd content is in the range of 3 to 9 mass percent. A soft magnetic film comprising an alloy having such a composition exhibits a saturation magnetic flux density Bs of at least 2.2 T and higher corrosion resistance compared to an FeCo alloy not containing Pd.

The relationship between the composition and the saturation magnetic flux density Bs of FeCoRh soft magnetic films was examined.

TABLE 3

| Sample | Composition (mass percent) | | | Fe/Co Ratio | saturation magnetic flux density (T) |
| --- | --- | --- | --- | --- | --- |
| | Fe | Co | Rh | | |
| 35 | 74.8 | 25.2 | 0.0 | 2.9 | 2.22 |
| 36 | 70.0 | 29.2 | 0.8 | 2.4 | 2.28 |
| 37 | 64.0 | 31.1 | 4.9 | 2.05 | 2.22 |

Samples 35, 36, and 37 were prepared and the Fe and Co contents and the Fe/Co ratio of these soft magnetic films were determined. As shown in Table 3, the Fe/Co ratio was about 2.9 for Sample 35, about 2.4 for Sample 37, and about 2.05 for Sample 37.

The Rh content was 0.8 mass percent for Sample 35 and 4.9 mass percent for Sample 37, but Rh was not contained in Sample 35.

Table 3 shows that Samples 36 and 37 containing Rh have a saturation magnetic flux density Bs exceeding 2.2 T.

In Samples 36 and 37, the Fe/Co ratio is in the range of 2 to 5 and the Rh (element α) content is in the range of 0.5 to 18 mass percent. These ranges are the same as the ranges in Pd. Within these ranges, the saturation magnetic flux density Bs exceeds 2.0 T and high corrosion resistance is achieved compared with the FeCo alloy not containing Rh.

The other elements Pt, Ru, Ir among the elements α are noble metals having equivalent properties to those of Pd and Rh. In these elements, a saturation magnetic flux density Bs of at least 2.0 T or preferably at least 2.2 T and high corrosion resistance will be achieved when the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, and the β content V is in the range of 0.5 to 5 mass percent.

What is claimed is:

1. A soft magnetic film having a composition represented by the formula $Fe_X Co_Y \alpha_Z$ wherein α is at least one element selected from the group consisting of Rh, Pd, Pt, Ru, and Ir, wherein the ratio X/Y by mass percent of Fe to Co is in the range of 2 to 5, the α content Z is in the range of 0.5 to 18 mass percent, and X+Y+Z=100 mass percent.

2. The soft magnetic film according to claim 1, wherein the ratio X/Y by mass percent of Fe to Co is in the range of 2.6 to 4.3 and the α content Z is in the range of 3 to 9 mass percent.

3. The soft magnetic film according to claim 1, further comprising an element β wherein β is at least one of Ni and Cr, the composition thereby being represented by the formula $Fe_X Co_Y \alpha_Z \beta_V$, wherein the β content V is in the range of 0.5 to 5 mass percent and X+Y+Z+V=100 mass percent.

4. A composite soft magnetic film comprising the soft magnetic film according to claim 1 and a NiFe alloy film formed on the soft magnetic film by plating.

5. The soft magnetic film according to claim 1, wherein the soft magnetic film is formed by plating.

6. A thin-film magnetic head comprising: a magnetic lower core layer, an upper core layer formed on the magnetic lower core layer with a magnetic gap provided therebetween, a coil layer for applying a recording magnetic field to the lower core layer and the upper core layer, wherein at least one of the lower core layer and the upper core layer comprises the soft magnetic film according to claim 1.

7. The thin-film magnetic head according to claim 6, further comprising a lower magnetic pole layer on the lower core layer and at a face opposing a recording medium, wherein the lower magnetic pole layer comprises the soft magnetic film.

8. A thin-film magnetic head comprising:

a lower core layer;

an upper core layer; and a magnetic pole unit provided between the lower core layer and the upper core layer, a length of the magnetic pole unit being shorter than that of the lower core layer and the upper core layer in a track width direction, the magnetic pole unit one of comprising: a lower magnetic pole layer in contact with the lower core layer; an upper magnetic pole layer in contact with the upper core layer; and a gap layer lying between the lower magnetic pole layer and the upper magnetic pole layer, and comprising an upper magnetic pole layer in contact with the upper core layer and a gap layer lying between the upper magnetic pole layer and the lower core layer, wherein at least one of the upper magnetic pole layer and the lower magnetic pole layer comprises the soft magnetic film according to claim 1.

9. The thin-film magnetic head according to claim 8, wherein the upper magnetic pole layer comprises the soft magnetic film according to claim 1, the upper core layer on the upper magnetic pole layer comprises a NiFe alloy and is formed by plating.

10. The thin-film magnetic head according to claim 7, wherein one of at least one of the upper core layer and the lower core layer includes at least two magnetic sublayers at a portion adjacent to the magnetic gap and at least one of the upper magnetic pole layer and the lower magnetic pole layer includes at least two magnetic sublayers, the magnetic sublayer in contact with the magnetic gap comprising the soft magnetic film.

11. The thin-film magnetic head according to claim 10, the magnetic sublayer which is not in contact with the magnetic gap is formed by plating a NiFe alloy.

12. The thin-film magnetic head according to claim 6, wherein the ratio X/Y by mass percent of Fe to Co is in the range of 2.6 to 4.3 and the α content Z is in the range of 3 to 9 mass percent.

13. The thin-film magnetic head according to claim 6, wherein the soft magnetic film further comprises an element β wherein β is at least one of Ni and Cr, the composition thereby being represented by the formula $Fe_XCo_Y\alpha_Z\beta_V$, wherein the β content V is in the range of 0.5 to 5 mass percent and X+Y+Z+V=100 mass percent.

14. The thin-film magnetic head according to claim 8, wherein one of at least one of the upper core layer and the lower core layer includes at least two sublayers at least at a portion adjacent to the magnetic gap and at least one of the upper magnetic pole layer and the lower magnetic pole layer includes at least two magnetic sublayers, the magnetic sublayer in contact with the magnetic gap comprising the soft magnetic film.

15. The thin-film magnetic head according to claim 14, the magnetic sublayer which is not in contact with the magnetic gap is formed by plating a NiFe alloy.

16. The thin-film magnetic head according to claim 8, wherein the ratio X/Y by mass percent of Fe to Co is in the range of 2.6 to 4.3 and the α content Z is in the range of 3 to 9 mass percent.

17. The thin-film magnetic head according to claim 8, wherein the soft magnetic film further comprises an element β wherein β is at least one of Ni and Cr, the composition thereby being represented by the formula $Fe_XCo_Y\alpha_Z\beta_V$, wherein the β content V is in the range of 0.5 to 5 mass percent and X+Y+Z+V=100 mass percent.

* * * * *